J. G. MARSH.
AUTOMOBILE SIGNAL.
APPLICATION FILED NOV. 13, 1912.

1,149,531.

Patented Aug. 10, 1915.

Witnesses
M. H. Slifer
R. M. Smith

Inventor
Joseph G. Marsh
By Victor J. Evans
Attorney

UNITED STATES PATENT OFFICE.

JOSEPH G. MARSH, OF MANCHESTER, NEW HAMPSHIRE.

AUTOMOBILE-SIGNAL.

1,149,531.   Specification of Letters Patent.   Patented Aug. 10, 1915.

Application filed November 13, 1912. Serial No. 731,133.

*To all whom it may concern:*

Be it known that I, JOSEPH G. MARSH, a citizen of the United States, residing at Manchester, in the county of Hillsboro and State of New Hampshire, have invented new and useful Improvements in Automobile-Signals, of which the following is a specification.

This invention relates to automobile signals, the object in view being to provide a simple and effective signal adapted to be applied as a whole to an automobile, and capable of adjustment or movement for the purpose of notifying the drivers of other machines, as well as pedestrians, that the machine bearing the signal is about to turn to the right or to the left, or to reverse and back, the signal being self-retaining in its adjusted position, and thereby requiring no further attention on the part of the driver of the machine, who has both hands free to operate the controls of the machine.

With the above and other objects in view, the invention consists in the construction, combination and arrangement of parts, as will be hereinafter more fully described, illustrated in the accompanying drawings, and pointed out in the claim hereunto appended.

Figure 1:
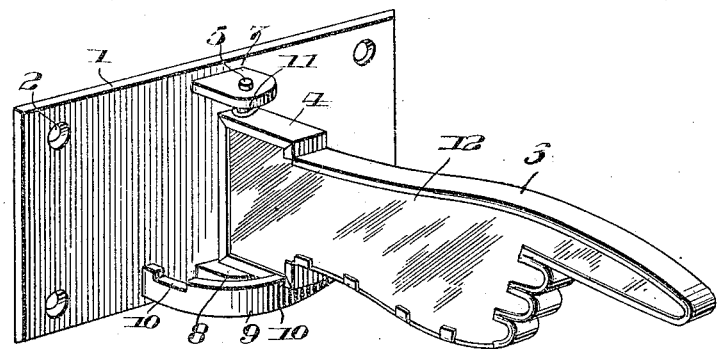
Figure 2:
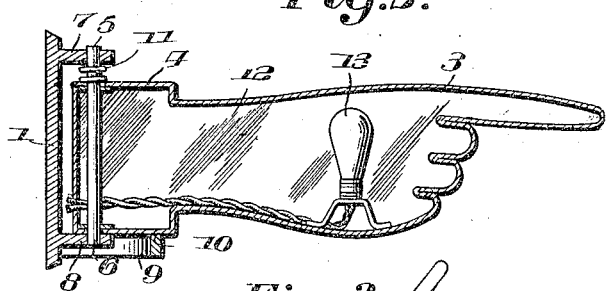
Figure 3:
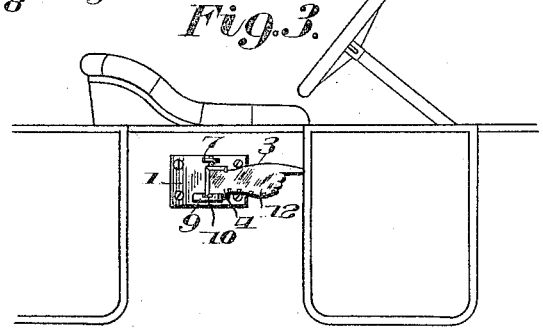

In the drawings, Figure 1 is a perspective view, showing the entire device detached from the machine. Fig. 2 is a cross section through the same, showing the pointer extended. Fig. 3 is a side elevation of a portion of an automobile body, showing the signal applied thereto.

The signal contemplated in this invention comprises essentially a base or support 1, which may consist of a board or plate of any suitable size provided with openings 2, adapting the same to be secured to the side of the body of an automobile or other mechanically propelled vehicle. It may be stated at this point that in the preferred application of the invention, two of such signals are to be provided, one at each side of the machine, within easy reach of the driver.

Mounted upon the base plate 1 is a pointer 3 which is shown, for convenience, in the form of a hand provided with a cuff or base 4 which is pivotally connected to the base plate 1. In the embodiment illustrated in the drawings, the pointer is shown as provided with upwardly and downwardly extending pintles 5 and 6, respectively, which are received in bearing lugs 7 and 8 on the base plate 1, the construction referred to enabling the pointer 3 to be swung through an arc of approximately 180°, so that the hand may point either forward or backward or laterally.

Secured to the base plate 1 is an arcuate rack or segment 9 provided with suitable notches 10, into which the bottom edge of the pointer 3 is adapted to drop, for the purpose of holding said pointer in any desired position. A spring 11 is shown coiled around the upper pintle 5, between the bearing lug 7 and the top of the pointer, said spring serving to yieldingly hold the pointer in engagement with any one of the notches 10 in the rack 9. At the same time, the hand may be readily lifted to disengage it from a notch, preparatory to swinging the hand in one direction or the other, until it is pressed downward by means of the spring 11 into engagement with another notch.

In order that the signal may be effective at night time, the pointer or hand 3 is made hollow and provided with glass or other transparent panels 12 in the front and rear sides thereof, sufficient space being provided within said hollow pointer for the reception of a lamp 13, shown in the form of an electric light bulb, from which conductors 14 lead to a course of electrical energy. It will, of course, be understood that any other form of illuminating lamp may be substituted for the electric light lamp, illustrated in the drawing. It will also be understood that the invention is not necessarily limited to a hand, as an arrow or pointer of any other description may be used in lieu thereof.

Under ordinary conditions, the pointers at opposite sides of the machine will be set forward in the direction in which the machine is traveling. When the machine is about to back, the pointers are reversed, so as to be directed toward the rear of the machine. When the driver desires to turn to one side or the other, the pointer is swung outward laterally on the side to which the machine is going to turn, thereby notifying the drivers of other machines and pedestrians as to the direction in which the machine is about to turn.

The device hereinabove described avoids the necessity of the driver or other occupant of the vehicle extending his hand or arm, in order to indicate the direction the machine is about to take, leaving both hands and arms free to manipulate the controls of the machine.

What is claimed is:

An electrically illuminable pointer comprising a marginal frame simulating in outline the human hand, with the index finger extended, and transparent panels applied laterally to said frame, means within said pointer for illuminating the same, means for pivotally supporting said pointer, and means for the retention of said pointer in different positions.

In testimony whereof I affix my signature in presence of two witnesses.

JOSEPH G. MARSH

Witnesses:
ANNA D. HILL,
JOHN O'NEILL.

Copies of this patent may be obtained for five cents each, by addressing the "Commissioner of Patents, Washington, D. C."